UNITED STATES PATENT OFFICE.

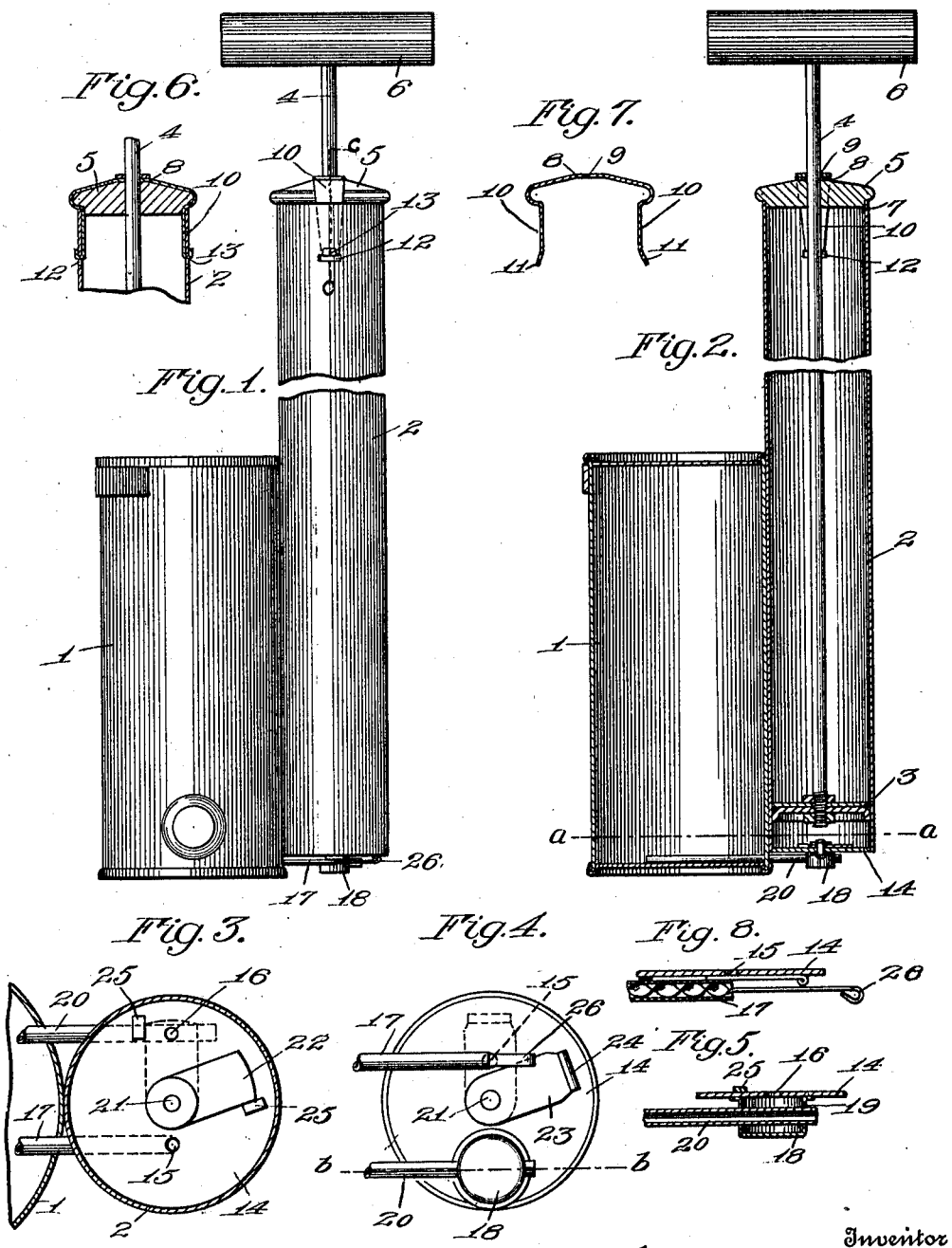

JAMES B. BARNES, OF CLIFTON SPRINGS, NEW YORK.

SPRAYER.

1,003,688.                Specification of Letters Patent.    Patented Sept. 19, 1911.

Application filed July 22, 1910.   Serial No. 573,204.

*To all whom it may concern:*

Be it known that I, JAMES B. BARNES, of Clifton Springs, in the county of Ontario and State of New York, have invented a new and useful Improvement in Sprayers, which improvement is fully set forth in the following specification and shown in the accompanying drawings.

The present invention relates to sprayers and more particularly to the type having a suitable air compressing means which causes the ejection of a liquid or disinfectant from a suitable container, and it has for an object the provision of a novel means for spraying in either of two directions such as in the direction of the longitudinal axis of an air compressing pump or transversely to said axis so that the sprayer may be used for spraying upwardly on bushes without the user getting down low.

Other objects are to improve the construction of the spraying devices or nozzles, to control properly both spraying devices, and to provide an inexpensive means for more securely retaining the pump head within its cylinder.

To these and other ends the invention consists in certain parts and combinations of parts all of which will be hereinafter described, the novel features being pointed out in the appended claims.

In the drawings: Figure 1 is a side view of a sprayer constructed in accordance with this invention; Fig. 2 is a longitudinal section; Fig. 3 is a section on line $a$—$a$ Fig. 2; Fig. 4 is a detail bottom view of the pump head; Fig. 5 is a section on line $b$—$b$ Fig. 4; Fig. 6 is a section on line $c$—$c$ Fig. 1; Fig. 7 shows the head securing strap before it is used; and Fig. 8 is a section showing the stem in position.

In the present embodiment of the invention there is employed container 1 for the material to be sprayed (such as a liquid insecticide) together with an air compressing means such as a cylinder 2 serving as a handle for the sprayer and having a piston 3 operating therein and controlled by a piston rod 4 extending through a perforated head 5 of the cylinder, a hand piece 6 being arranged on the rod to operate the pump.

One of the features of this invention is the manner of securing the head 5 to the cylinder. Preferably the head seats against the end of the cylinder and has a portion 7 fitting in the latter for the purpose of preventing lateral movement. To hold the head in position a strap is provided. The form of this strap before use is shown in Fig. 7 and it comprises a central portion 8 formed to pass about the head and provided with a perforation 9 through which the piston rod passes. The arms 10 are formed to enter the cylinder and their extreme ends 11 are turned outwardly so that when the openings 12 in opposite sides of the cylinder near one end of the latter are reached they will be in a position to be engaged and bent upwardly at 13 to interlock with the walls of the opening.

Preferably the sprayer is provided with two spray delivering devices and for this purpose the head 14 of the pump cylinder is provided with two openings 15 and 16 through which air from the pump is forced. The air passing from opening 15 travels in a direction transversely of the discharge of a delivery tube 17 which projects laterally from the container 1, the latter preferably projecting slightly beyond the end of the pump cylinder so that it may support the sprayer and prevent injury to the spray delivering devices. It is apparent that the spraying device formed by opening 15 and the end of the discharge tube 17 will deliver a spray in the direction of the axis of the pump cylinder.

The air passed through the opening 16 is directed in a line transverse to the axis of the pump cylinder and to this end a cap 18 may be soldered or otherwise secured to the head of the cylinder over the opening 16 and has a discharge opening 19 in one side thereof. This opening directs the air in line with a delivery tube 20 that extends from the container 1 through the wall of the cap opposite the opening 19 and projects through said opening in spaced relation to the walls of the latter, thus providing a spray delivering device directing a spray transverse to the axis of the pump cylinder.

It is desirable to shut off or close one of the spray delivery devices while the other is used and to this end there may be provided a pair of valves one for each spray delivery device, such valves being preferably manually operable and connected together in such a manner that one closes as the other opens. In this instance, a shaft 21 is journaled in the head of the pump and has a valve 22 secured at its inner end and arranged to cover the opening 16. At its outer end is arranged a valve 23 to cover the opening 15 by passing beneath tube 17. The valve 23 may have a finger piece 24 by which it is operated and stops 25 may be arranged on the inner side of the pump head to coöperate with valve 22 and limit the movement of the valves.

To the end of producing a finer spray there may be provided a stem 26 arranged in and projecting from the tube. This stem performs two functions: it reduces the size of the discharge relatively to the air opening 15 and at the same time it serves to conduct the liquid back to the tube 17 thus preventing any dripping. The stem is preferably removable so as to get an increased supply of the liquid and may be spirally formed so that it holds itself in place and provides a spiral passageway.

In using the device one of the openings 15 or 16 is closed while the other is opened by shifting the valves 22 and 23. Assume that the opening 16 is open then upon the operation of the pump plunger air will be discharged in the direction of the tube 20 causing a spray to be delivered transversely to the axis of the pump cylinder. On the other hand, if the opening 15 is open the air will be discharged by the pump in a line transverse to the axis of the tube 17 causing the spray to be delivered in the direction of the axis of the pump cylinder. If the stem 26 is removed a heavy spray is secured while with the stem in position a very fine spray is obtained making the sprayer adapted for household use without dripping.

A sprayer constructed in accordance with this invention will deliver sprays in different directions with reference to the handle of the sprayer so that it is possible to get up under the leaves of low bushes or the like with no inconvenience. The structure for producing this result is simple in operation, inexpensive to manufacture and durable in use. The head of the pump is secured by a means which is very strong and durable and not so expensive to manufacture as present devices. The sprayer may also be used for household purposes as a very fine spray may be secured without any dripping.

What I claim as my invention and desire to secure by Letters Patent is:

1. In a sprayer, the combination with a pump cylinder having an opening therein and a container, of a cap secured over said opening on the outer side thereof, a distributing tube leading from the container through said cap so that air in the latter passes about the tube, and a manually operable valve operating on the inner side of the opening.

2. In a sprayer, the combination with a pump cylinder having a head provided with an opening, and a cap secured to the head over the opening and provided with an opening, of a discharge tube extending through a wall of the cap and having its end projecting through the opening in the latter, and a manually controllable valve on the inner side of the head to close the opening in the latter.

3. In a sprayer, the combination with a pump cylinder having a head provided with an opening, and a cap secured to the head over the opening and provided with an opening, of a manually operable valve arranged to rotate on the inner side of the head to open and to close the opening in the head, a container, and a discharge tube leading from the container through the cap and having its discharge projecting through the opening in the cap.

4. In a sprayer, the combination with a pump cylinder and a piston adapted to reciprocate therein, of a container, two delivery tubes leading from said container, one of said tubes receiving from the cylinder a blast which directs a spray in the direction of the length of the cylinder and the other tube receiving from the cylinder a blast which directs a spray transversely of the length of the cylinder, separate valves for cutting off the blast to the delivery tubes, and a connection between said valves whereby one opens the blast to one tube while the other closes the blast to the other tube.

5. In a sprayer, the combination with a pump cylinder and a container, of two separate spray delivering means one arranged to deliver a spray in the direction of the longitudinal axis of the pump cylinder and the other to deliver a spray transversely to said axis, and means for simultaneously shutting off one spray delivering means and opening the other.

6. In a sprayer, the combination with a pump cylinder having two openings, of a pair of valves connected together and one arranged to close one opening when the other valve opens the other opening, and delivering tubes having their discharges acted upon by air passed through the openings of the pump cylinder.

7. A sprayer comprising a container, a delivery tube leading therefrom, a pump cylinder having a discharge delivering onto and transversely of the end of the delivery tube, and a stem arranged within and projecting from the delivery tube and formed from a strip of sheet material spirally twisted.

8. In a sprayer, the combination with a pump cylinder having two openings, of a pair of delivery tubes one having its discharge at one of the openings so that the air passes transversely of the length of the tube, means for directing the air from the other opening in the direction of the length of the tube, and a pair of valves connected so that one opens one of the cylinder openings while the other valve closes the other opening.

9. In a sprayer, the combination with a pump cylinder having a head provided with two openings, of a container projecting beyond said head, laterally extending delivery tubes leading from the container, one having its discharge end located at one of the openings in the cylinder head, a cap secured to the head over the other opening and having the other tube projecting therefrom, an opening being provided in the cap about the tube, a pair of valves, one operating within the cylinder to open and close one opening in the head and the other operating on the outside of the cylinder to open and close the other opening, and a shaft turning in the head and connecting the valves.

In witness whereof I have hereunto set my hand this 19th day of July, 1910, in the presence of two subscribing witnesses.

JAMES B. BARNES.

Witnesses:
VICTOR C. WASHBURN,
ERNEST SALTER.

Copies of this patent may be obtained for five cents each, by addressing the "Commissioner of Patents, Washington, D. C."